(12) United States Patent
Ono

(10) Patent No.: US 8,456,685 B2
(45) Date of Patent: Jun. 4, 2013

(54) IMAGE FORMING APPARATUS SEARCHING AN REGISTERING OBJECTS OF INTEREST IN A CACHE BASED ON A CRITERION

(75) Inventor: Takashi Ono, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/713,095

(22) Filed: Feb. 25, 2010

(65) Prior Publication Data

US 2010/0241805 A1 Sep. 23, 2010

(30) Foreign Application Priority Data

Mar. 19, 2009 (JP) ................... 2009-069011

(51) Int. Cl.
*G06K 15/00* (2006.01)

(52) U.S. Cl.
USPC .............. 358/1.16; 358/1.1; 358/1.9

(58) Field of Classification Search
USPC ............ 358/1.1, 1.2, 1.9, 1.11, 1.16, 462
See application file for complete search history.

(56) References Cited

U.S. PATENT DOCUMENTS

| 5,587,800 A | * | 12/1996 | Miyazaki | 358/296 |
| 6,348,975 B1 | * | 2/2002 | Tsunekawa et al. | 358/1.17 |
| 6,867,872 B1 | * | 3/2005 | Kurihara et al. | 358/1.11 |

FOREIGN PATENT DOCUMENTS

| JP | 2000-207150 A | 7/2000 |
| JP | 2001216110 A | 8/2001 |
| JP | 2004-030655 A | 1/2004 |
| JP | 2004-110337 A | 4/2004 |
| JP | 2007-083556 A | 4/2007 |
| JP | 2008-046688 A | 2/2008 |

OTHER PUBLICATIONS

Japanese Office Action dated Mar. 4, 2013 in Japanese Application No. 2009-069011.

* cited by examiner

*Primary Examiner* — Thomas D Lee

(74) *Attorney, Agent, or Firm* — Fitzpatrick, Cella, Harper & Scinto

(57) ABSTRACT

An object attribute is determined with respect to an object and a determination is performed as to whether or not to execute image cache processing in response to the object attribute. By switching processing in accordance with this, execution of time-consuming image specifying processing is kept to a necessary minimum and performance reductions can be avoided. Furthermore, cache registration is avoided for images having low reusability, which achieves improvements in cache usage efficiency and improvements in cache search efficiency, thereby enabling performance to be improved.

17 Claims, 11 Drawing Sheets

|  | 501<br>FILL ID | 502<br>ARITHMETIC VALUE | 503<br>REGISTRATION PERIOD |
|---|---|---|---|
| 0 | 0 | 323432 | "CONTINUOUS" |
| 1 | 2 | 83040 | "PAGE" |
| 2 | 3 | 65344343 | "NEXT ONLY" |
|  | ⋮ | ⋮ | ⋮ |
| 256 | 800 | 349509 | "CONTINUOUS" |

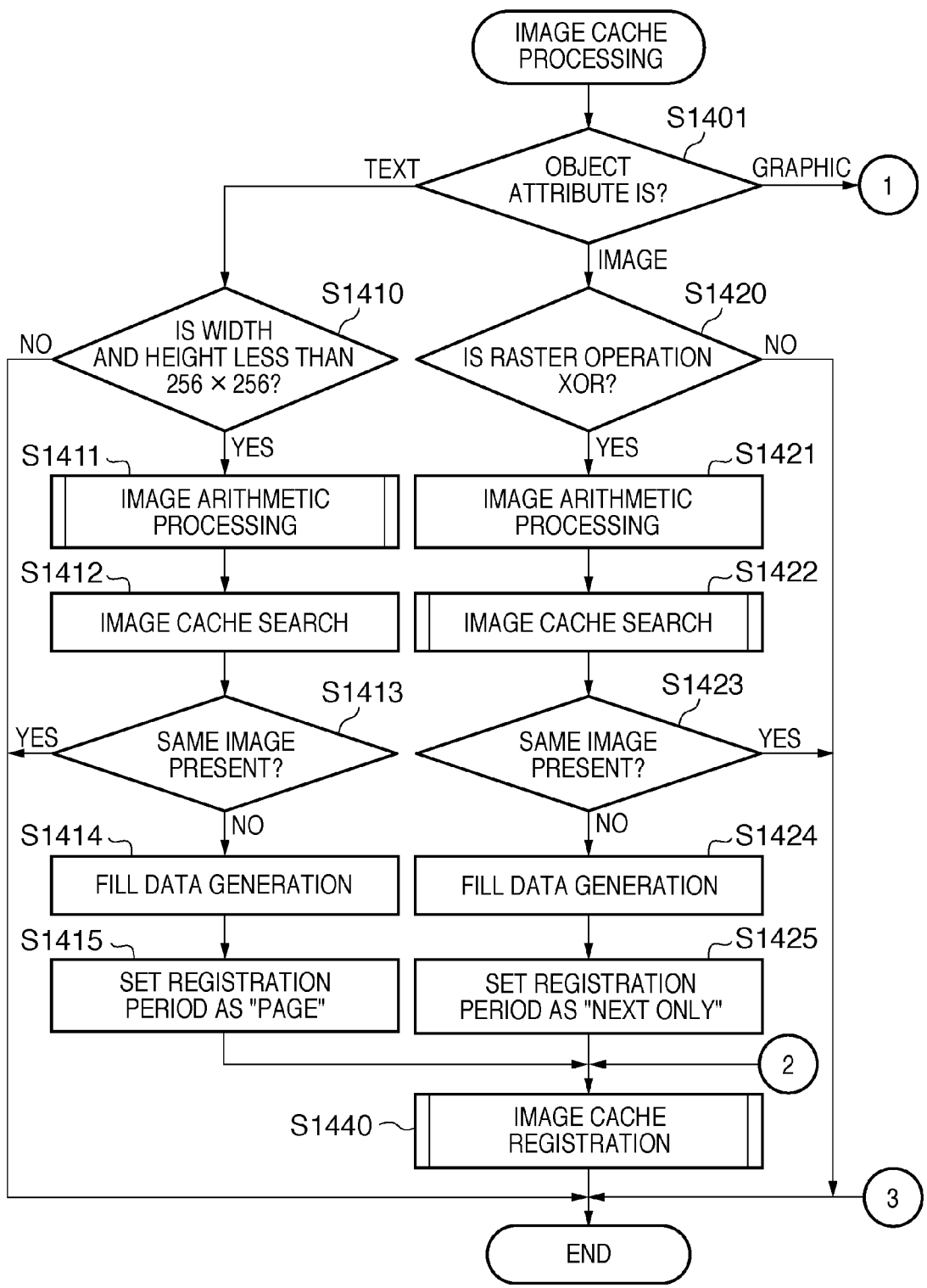

IMAGE FORMING APPARATUS SEARCHING AN REGISTERING OBJECTS OF INTEREST IN A CACHE BASED ON A CRITERION

BACKGROUND OF THE INVENTION

1. Field of the Invention

The present invention relates to image forming apparatuses, and control methods and programs thereof.

2. Description of the Related Art

In recent years, image forming apparatuses have been developed that can handle various types of print data. Since print data is created by a large number of users who use a wide range of applications, there are cases where, depending on the print data, its volume may be very large. Extremely large amounts of time are required to process print data containing large volumes of data, which is a cause of major reductions in performance. Further still, although there are cases where resolution or tone is reduced to avoid memory insufficiencies caused by using large volumes of memory, this is a cause of reductions in output quality. To avoid these problems, data is reused using a cache when identical sets of data are present, which reduces the amount of memory used and inhibits reductions in output quality. Further still, improved performance is achieved by improving efficiency in CPU caches during image rendering. Also, in regard to caches, it is possible to delete cache data that has become old to improve search efficiency (see Japanese Patent Laid-Open No. 2001-216110).

Image cache processing based on conventional methods involves carrying out arithmetic processing for comparing the content of the image data with the content of the cache that is currently being held, or carrying out processing for searching the cache with respect to all the image data contained in the print data. The aforementioned Japanese Patent Laid-Open No. 2001-216110 also requires executing cache processing on all data objects. Accordingly, in a case of processing PDL data containing large amounts of image data, cache-related processing increases, which unfortunately is a cause of reduced printing speeds.

SUMMARY OF THE INVENTION

The present invention provides an image forming apparatus, and a control method and program thereof that are configured to suppress to a necessary minimum the execution of time-consuming image specifying processing and avoid reductions in performance.

According to a first aspect of the present invention, there is provided an image forming apparatus, comprising: an analysis unit configured to analyze print data and give interest successively to objects contained in the print data, an attribute determination unit configured to determine from among a plurality of object attributes an object attribute possessed by an object of interest, a cache search unit configured to search for the object of interest in a cache, a cache registration unit configured to register the object of interest in the cache, and an execution decision unit configured to decide based on the object attribute of the object of interest whether or not to apply the cache search unit and the cache registration unit on the object of interest.

According to a second aspect of the present invention there is provided a control method for an image forming apparatus, comprising: analyzing print data and giving interest successively to objects contained in the print data, determining from among a plurality of object attributes an object attribute possessed by an object of interest, searching for the object of interest in a cache, registering the object of interest in the cache, and deciding based on the object attribute of the object of interest whether or not to apply the cache searching and the cache registering for the object of interest.

According to a third aspect of the present invention there is provided a computer-readable storage medium storing a computer program that causes a computer to function as: an analysis unit configured to analyze print data and give interest successively to objects contained in the print data, an attribute determination unit configured to determine from among a plurality of object attributes an object attribute possessed by an object of interest, a cache search unit configured to search for the object of interest in a cache, a cache registration unit configured to register the object of interest in the cache, and an execution decision unit configured to decide based on the object attribute of the object of interest whether or not to apply the cache search unit and the cache registration unit on the object of interest.

Further features of the present invention will be apparent from the following description of exemplary embodiments with reference to the attached drawings.

BRIEF DESCRIPTION OF THE DRAWINGS

FIGS. 5A and 5B are diagrams showing details of a flowchart of cache processing according to the present embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

System Configuration

Figure 1:
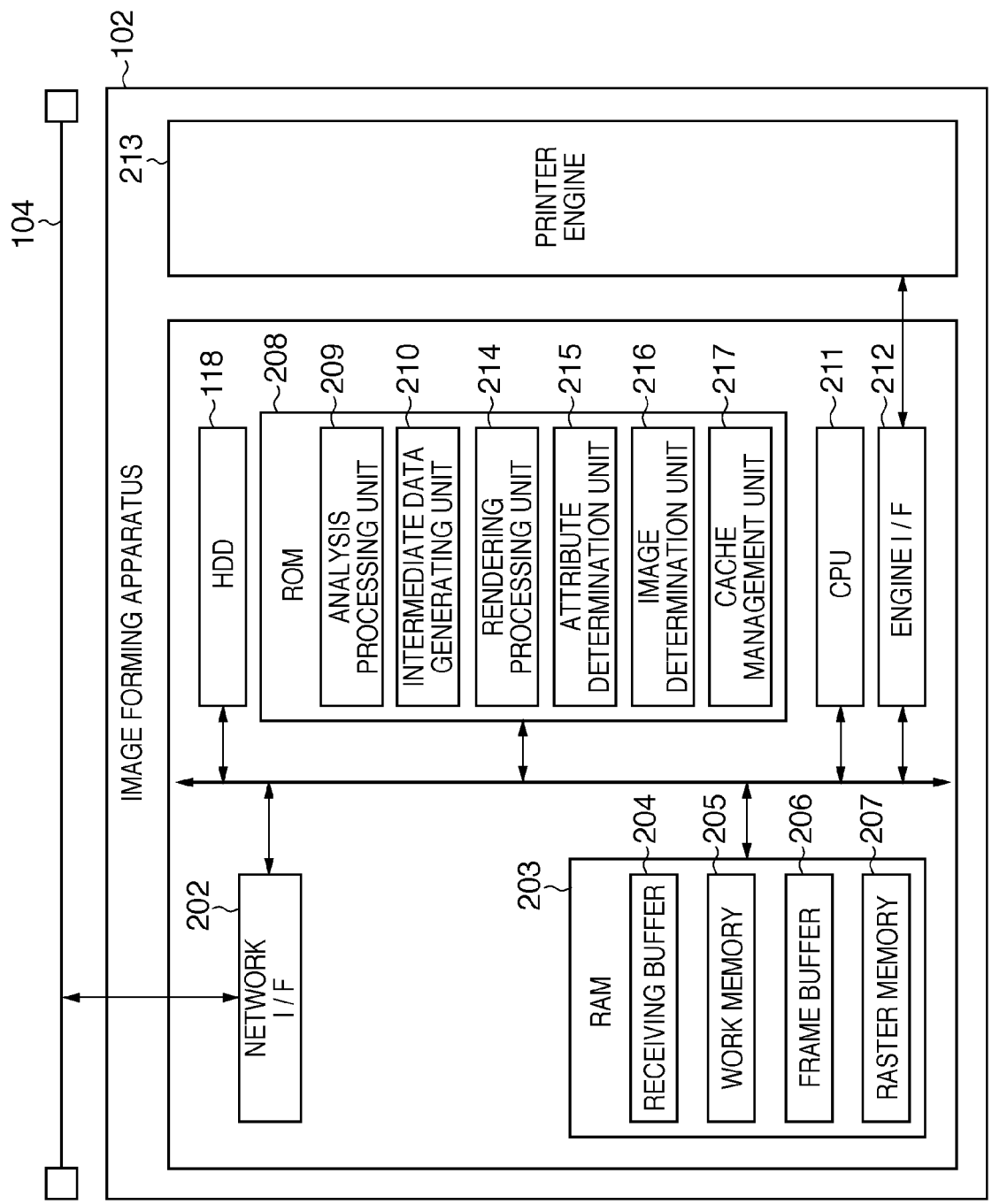
FIG. 1 is a diagram showing one example of a configuration of an image forming apparatus according to the present embodiment.

FIG. 1 is a diagram showing one example of a configuration of an image forming apparatus 102 according to the present embodiment. A network I/F 202 carries out input and output of information with external device(s), and receives print data that has been transmitted from external device(s). A RAM 203 temporarily stores various information. The RAM 203 is constituted by a receiving buffer 204, a work memory 205, a frame buffer 206, and a raster memory 207. The receiving buffer 204 is a memory that stores print data that has been received via the network I/F 202. The work memory 205 is a memory that is temporarily used when converting data that has been input into intermediate data. The frame buffer 206 stores intermediate data and the like that is internal to the printer. The raster memory 207 stores data of rendered intermediate data. An HDD 118 is a storage area and holds various types of data.

A ROM 208 stores control codes of the CPU 211 in the image forming apparatus 102. In the ROM 208, an analysis processing unit 209, an intermediate data generating unit 210, a rendering processing unit 214, an attribute determination unit 215, and an image determination unit 216 are realized as functional configurations. The analysis processing unit 209 analyzes data that has been read out from the receiving buffer 204 and distributes the data to predetermined processes based on an analysis result thereof. The intermediate data generating unit 210 generates intermediate data from the data analyzed by the analysis processing unit 209 and stores this in the frame buffer 206. The rendering processing unit 214 stores image data, which is rendered data of intermediate data that had been stored in the frame buffer 206, and stores this in the raster memory 207. The attribute determination unit 215 distinguishes classes of drawing data analyzed by the analysis processing unit 209. In a case where the data analyzed by the analysis processing unit 209 is image data, the image determination unit 216 carries out a process of specifying content of the image data such as image attributes. A cache management unit 217 manages cache information to enable reuse of image data.

A central processing unit (CPU) 211 carries out arithmetic processing and control of the image forming apparatus 102. An engine I/F 212 carries out input and output of signals with a printer engine 213. The printer engine 213 forms a latent image on a photosensitive drum using a well-known electrophotographic process based on the image data, and carries out printing by transferring and fixing this to a paper.

It should be noted that the present embodiment can also be achieved by having a program, which is held in an internally or externally connected storage medium, read out to the RAM 203, then having the CPU 211 execute this program.

Flow of Processing in Cache Function of Image Forming Apparatus

Figure 2:
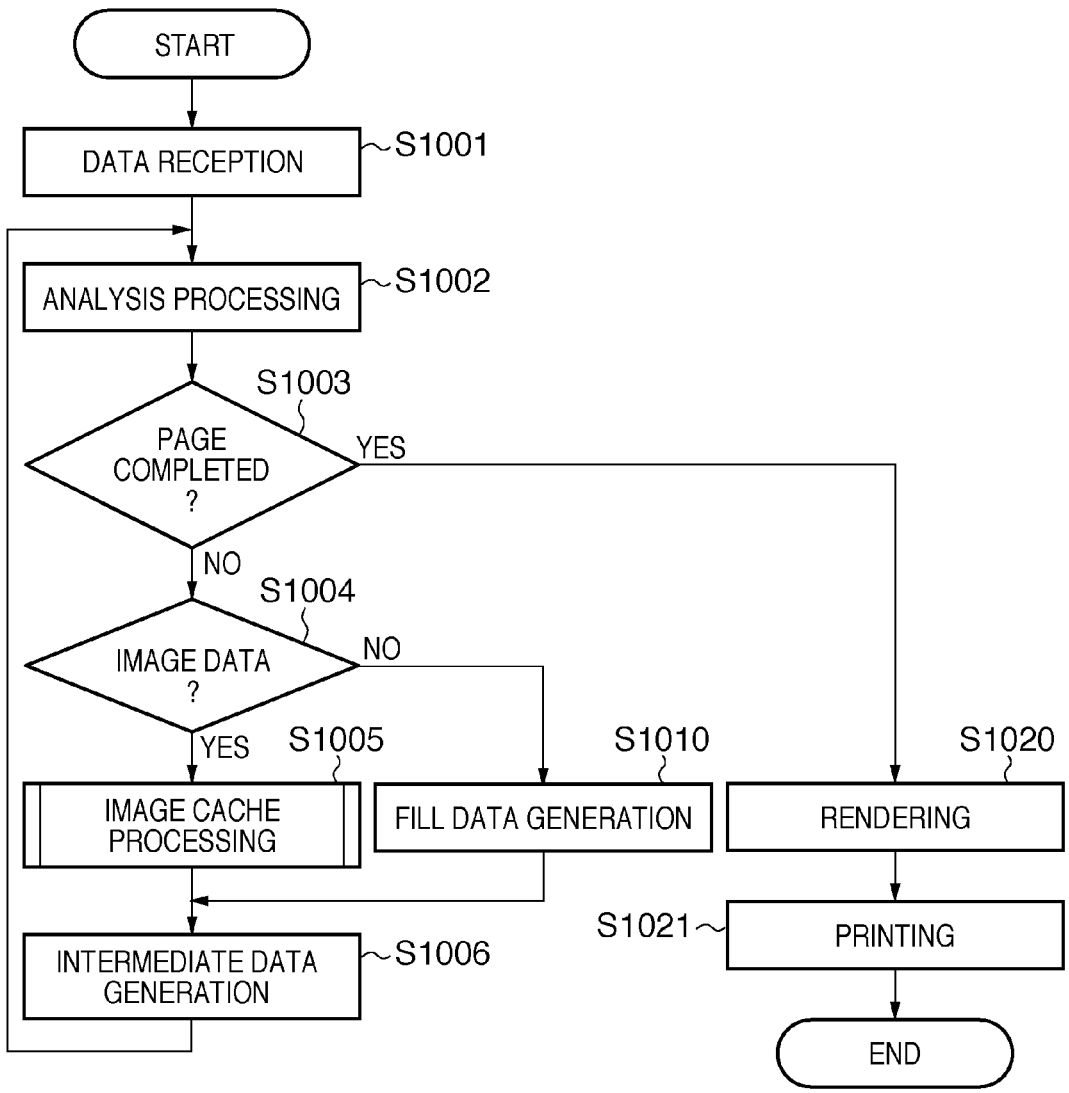
FIG. 2 is a diagram showing a flowchart of cache processing according to the present embodiment.

FIG. 2 is a diagram showing a flowchart of cache processing. At S1001, the image forming apparatus 102 receives via the network I/F 202 PDL (page description language) data from a host computer connected to the network 104, and stores this in the receiving buffer 204. At S1002, the PDL data stored in the receiving buffer 204 undergoes a PDL data analysis process by the analysis processing unit 209. In addition to drawing commands that describe objects within an image for example, PDL data contains commands for controlling print processing. In the analysis processing, these commands are extracted for a later determination. At S1003, a determination is performed based on an analysis result of the PDL data as to whether or not a page is completed. In a case where the determination result is that a page is not completed (no at S1003), a determination is performed at S1004 as to whether or not this is image data. Here, image data refers to image objects contained in the print data, namely, drawing commands. Accordingly, commands other than drawing commands are determined to be not image data. In a case of image data (yes at S1004), image cache processing is carried out at S1005. After this, at S1006, the intermediate data generating unit 210 generates intermediate data in regard to each command and stores this in the frame buffer 206. On the other hand, in a case other than image data (no at S1004), fill data of color information or the like is generated at S1010 and intermediate data is generated at S1006. After intermediate data generation has been carried out at S1006, the procedure returns to S1002. When it is determined at S1003 that the page is completed (yes at S1003), the intermediate data stored in the frame buffer 206 undergoes rendering in the rendering processing unit 214 at S1020, and this is stored in the raster memory 207. Then, at S1021, the raster data stored in the raster memory 207 is outputted to the printer engine 213 via the engine I/F 212 and printing is carried out.

Here, object attributes will be briefly described. The image data (object) obtained through analysis of the PDL data has one of "text," "image," or "graphic" as its object attribute. Although details are described using FIGS. 5A and 5B, in the present embodiment use is made of object attributes in determining the application of cache processing. It should be noted that text, for example, refers to characters described by character codes, and compressed/uncompressed bitmap images and graphics refer to images or the like described by vectors or functions. Text and graphics and the like can be identified by their actual drawing commands or by parameters and the like.

Example Configuration of Fill Table

Figures 3, 4:
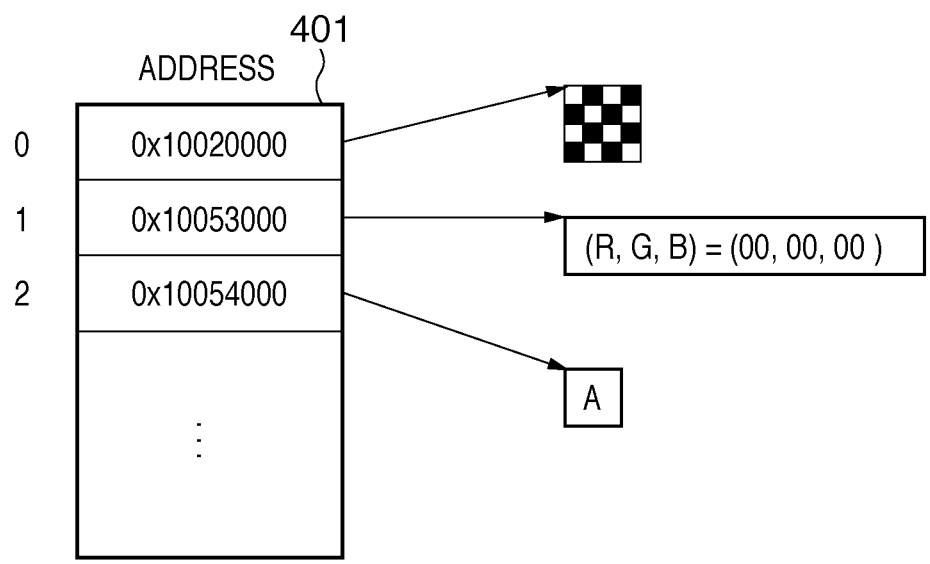
FIG. 3 is a diagram showing a configuration example of a fill table according to the present embodiment.
FIG. 4 is a diagram showing an example of a cache table according to the present embodiment.

FIG. 3 is an example configuration of a fill table for managing drawing information such as color information and the image data generated in the intermediate data generating unit 210 and stored in the frame buffer 206. The fill table is configured so as to be capable of holding multiple beginning addresses 401 of drawing information such as color information and image data stored in the frame buffer 206.

Example Configuration of Cache Table

FIG. 4 is a configuration example of a cache table that is managed in the work memory 205 by the cache management unit 217 in the present embodiment. The cache table is configured having multiple sets in which items of a fill ID 501 of the fill table in the work memory 205, an arithmetic value 502, and a registration period 503 are associated with each other. It should be noted that the arithmetic value 502 is calculated by the image determination unit 216. Furthermore, the registration period 503 indicates a period in which the cache is registered and held. "Continuous," "next only," or "page" is set as the value of the registration period. It should be noted that "continuous" corresponds to an object attribute of graphics, "next only" corresponds to an object attribute of images, and "page" corresponds to an object attribute of text.

Of course, the above-mentioned registration periods are only examples, and the registration periods may be set longer or conversely shorter in response to factors such as the capacity of the cache. Furthermore, although three types of registration periods are defined in the present embodiment, it is also possible to define others. For example, since text has a high usage period frequency in documents, if the cache capacity allows, it may be registered as "job," which has a longer registration period, thereby enabling further shortening of processing times. Either way, by caching objects having a high probability of reuse for longer and caching objects having a low probability of reuse for shorter amounts of time, the usage efficiency of the cache is improved.

Flowchart of Image Cache Processing

Figure 5B:
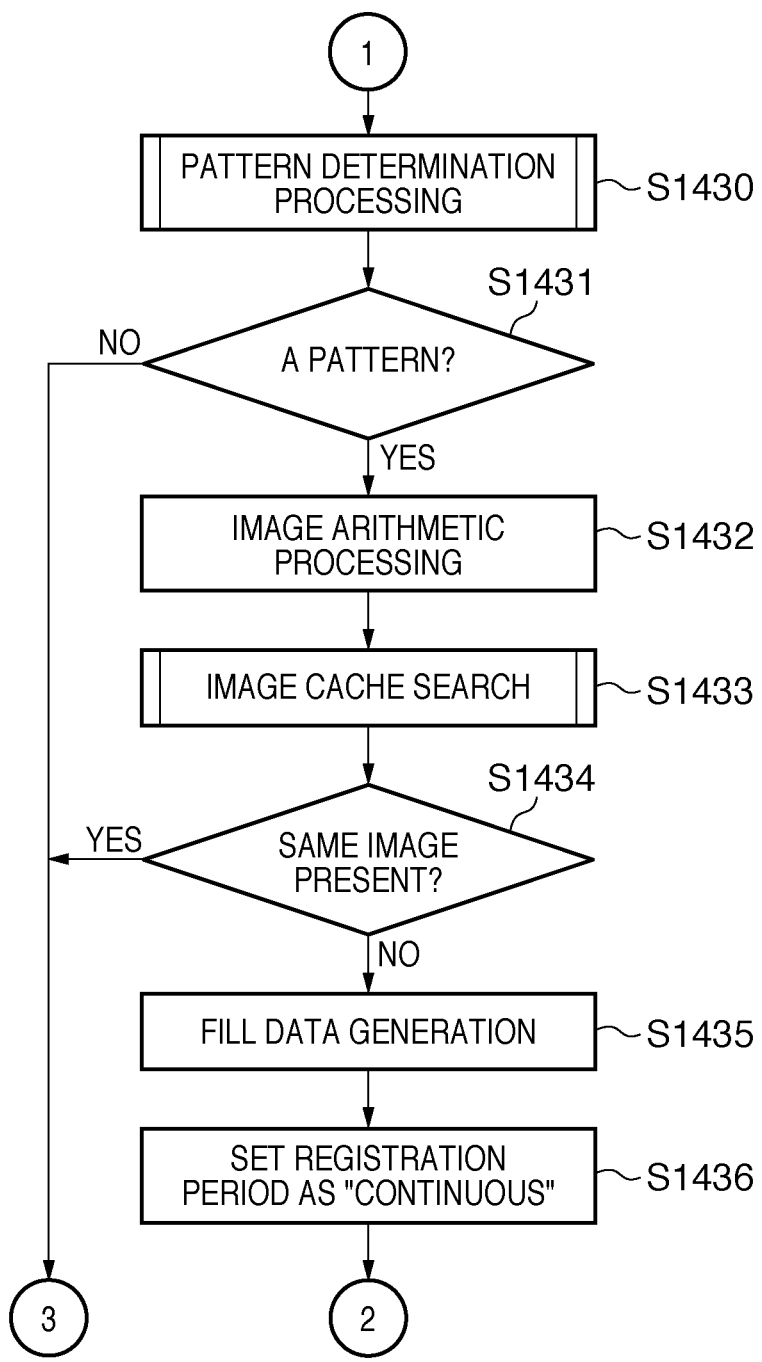

FIGS. 5A and 5B are diagrams showing a flowchart of image cache processing at S1005 in the present embodiment. At S1401, the object attribute obtained by the attribute determination unit 215 is determined. In a case where the object attribute is text, a determination is performed at S1410 as to whether or not the width×height size of the image data of PDL data analyzed by the analysis processing unit 209 is 256×256 (approximately 16 pt at 600 dpi) or less. Based on a determination result thereof, a decision is made as to whether or not to carry out processing thereafter. In this way, an execution decision unit is achieved for processing on images whose attribute is "text." In a case where the size of the image data is larger than a threshold (no at S1410), the present process finishes. On the other hand, in a case where the size of the image data is the threshold or smaller (yes at S1410), arithmetic processing is carried at S1411 in the image determination unit 216 for specifying the content of the image data. Then, at S1412, the image cache stored in the work memory 205 is searched by the cache management unit 217. Image cache search processing is described later using FIG. 7. In a case where the cache management unit 217 determines that the same image data is not registered in the image cache (no at S1413), fill data for the image data is generated at S1414 and stored in the frame buffer 206. At S1415, the period to be registered in the image cache is set as "page," then at S1440, this is registered in the image cache stored in the work memory 205. Then, the present process finishes. In a case where it is determined at S1413, as a result of the search, that the same image is registered, the present process then finishes.

In a case where the object attribute is determined as image at S1401, the procedure proceeds to S1420 and a raster operation (drawing logic) determination is carried out in the analysis processing unit 209 to indicate a method by which the image data is to be drawn. Here, a determination is performed as to whether or not the raster operation is XOR. In this way it is decided whether or not to carry out processing relating to registration to the cache thereafter. In this way, an execution decision unit is achieved for processing on images whose attribute is "image." It should be noted that this values other than XOR may also exist, but since raster operation (drawing logic) is a general item, description thereof is omitted here. In a case where the raster operation is not XOR (no at S1420), the present process finishes. On the other hand, in a case where the raster operation is XOR (yes at S1420), image arithmetic processing is carried out at S1421, image cache searching is carried out at S1422, and registration determination is carried out at S1423 in a same manner as for text. In a case where it is determined that the same image data is not registered in the image cache (no at S1423), fill data is generated at S1424 and stored in the frame buffer 206. At S1425, the period to be registered in the image cache is set as "next only," then at S1440, this is registered in the image cache stored in the work memory 205. Then, the present process finishes. In a case where it is determined at S1423 as a result of the search that a same image is registered, then the present process finishes.

In a case where the object attribute is determined as graphic at S1401, the procedure proceeds to S1430 and a pattern determination process is carried out in the analysis processing unit 209. Pattern determination processing is described later using FIG. 6. According to this result, it is decided whether or not to carry out processing relating to registration to the cache thereafter. In this way, an execution decision unit is achieved for processing on images whose attribute is "graphic." After this, the procedure proceeds to S1431 and a determination is performed as to whether or not the data is a pattern. In a case where it is determined the data is not a pattern (no at S1431), the present process finishes. On the other hand, in a case where it is determined that the data is a pattern (yes at S1431), image arithmetic processing is carried out at S1432, image cache searching is carried out at S1433, and registration determination is carried out at S1434 in a same manner as for the other objects. In a case where it is determined that the same image data is not registered in the image cache (no at S1434), fill data is generated at S1435 and stored in the frame buffer 206. At S1436, the period to be registered in the image cache is set as "continuous," then at S1440, this is registered in the image cache stored in the work memory 205. Image cache registration processing is described later using FIG. 8. After this, the present process finishes. In a case where it is determined at S1434 as a result of the search that a same image is registered (yes at S1434), then the present process finishes.

Flowchart of Pattern Determination Processing

Figure 6:
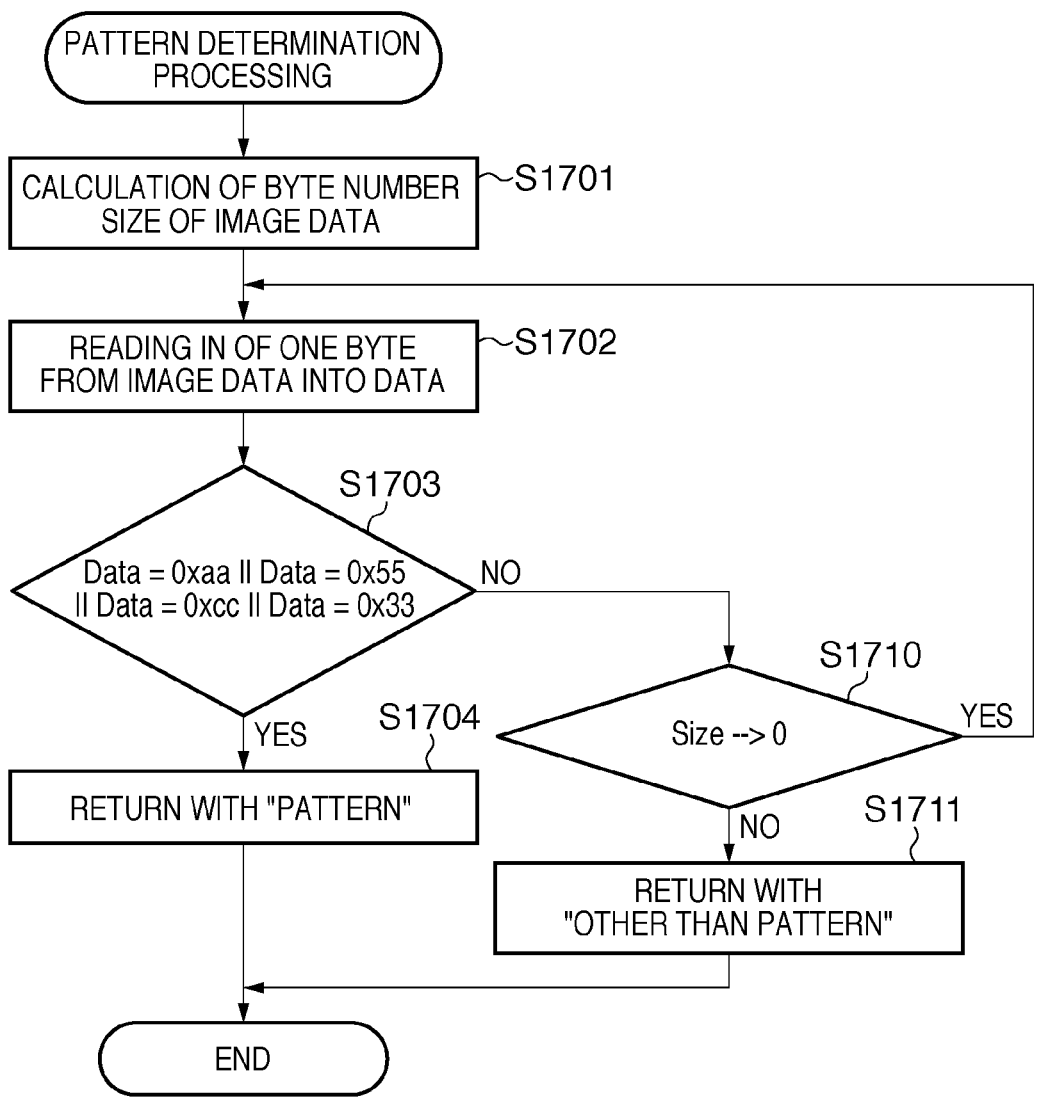
FIG. 6 is a diagram showing a flowchart of pattern determination processing according to the present embodiment.

FIG. 6 is a diagram showing a flowchart of pattern determination processing at S1430 in FIG. 5B. At S1701, a byte number of the image data is calculated and the calculated value is set to an argument Size. At S1702, one byte of data is read from the image data into an argument Data. At S1703, a determination is performed as to whether or not a condition of "Data=0×aa||Data=0×55||Data=0×cc||Data=0×33" is satisfied. In a case where the condition is satisfied (yes at S1703), the data is returned with "pattern" at S1704. It should be noted that "||" in the above conditional expression indicates a logical OR operator.

On the other hand, in a case where the condition is not satisfied (no at S1703), Size is decremented at S1710 and in a case where Size is larger than zero (yes at S1710), the procedure returns to S1702 and the next one byte is read in from the image data, and the determination is repeated. In a case where Size is zero at S1710 (no at S1710), the data is returned with "other than pattern" at S1711. Then, the present process finishes.

It should be noted that the conditional expression shown at S1703 is one example for detecting a repetitive pattern, and as such another conditional expression may be used.

Flowchart of Image Cache Search Processing

Figure 7:
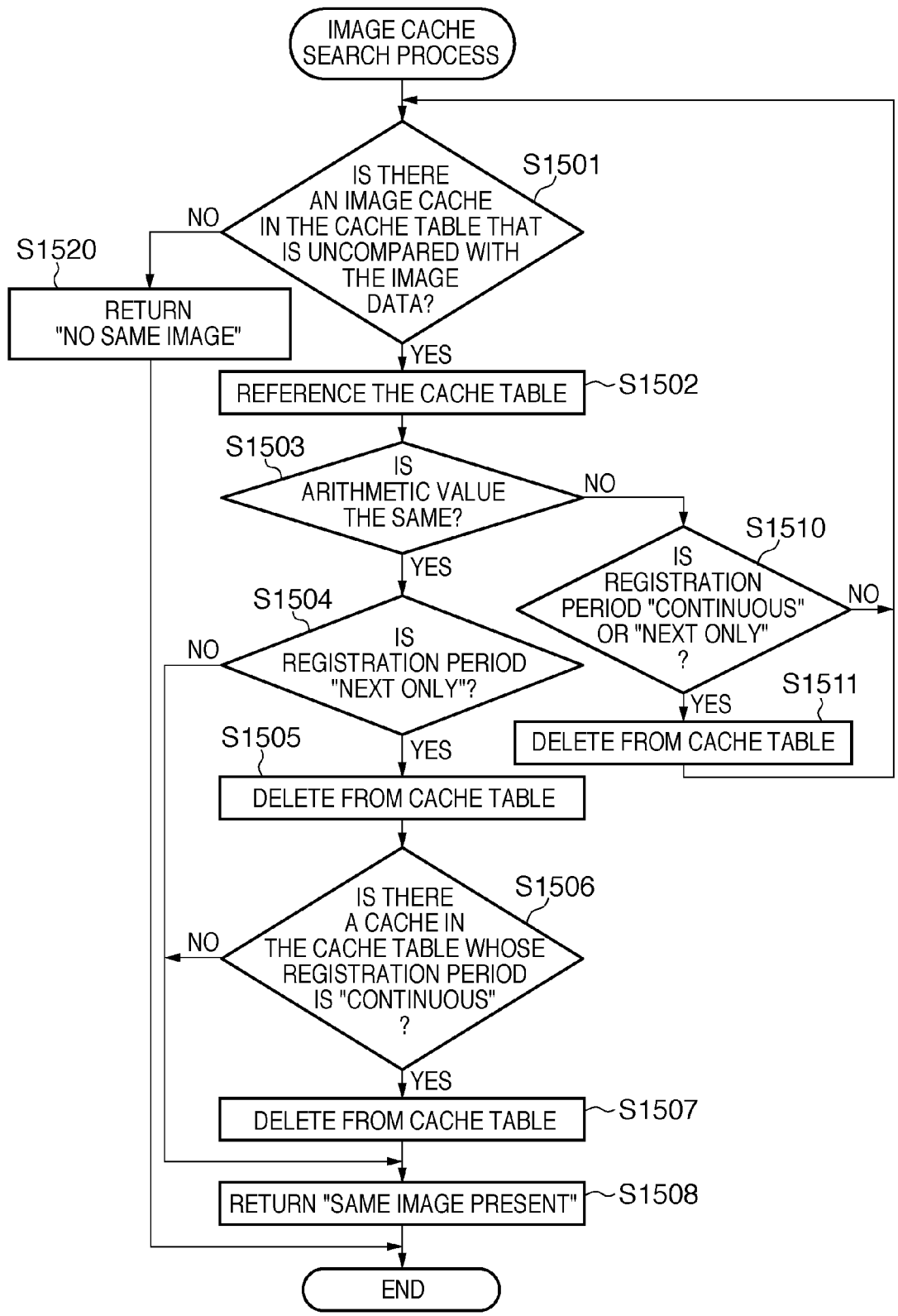
FIG. 7 is a diagram showing a flowchart of cache search processing according to the present embodiment.

FIG. 7 is a diagram showing a flowchart of image cache search processing corresponding to S1412, S1422, and S1433. At S1501, a determination is performed as to whether or not there is an image cache among the image caches already registered in the cache table that has not been compared with the relevant image data. In a case where there is an uncompared cache among the image caches already registered in the cache table (yes at S1501), interest is given to the uncompared image cache (hereinafter, object of interest), and the cache table is referenced at S1502. Then, at S1503, the arithmetic value of the relevant image data calculated at either S1411, S1421, or S1431 and a value of the object of interest are compared. In a case where the arithmetic value is the same (yes at S1503), the registration period 503 of the object of interest is further referenced at S1504 and a determination is performed as to whether or not the value is "next only." In a case where the value of the registration period item is "next only" (yes at S1504), the object of interest is deleted from the cache table at S1505. Further still, at S1506, a determination is performed as to whether or not there is an image cache among the image caches registered in the cache table whose value of the registration period 503 item is "continuous." In a case where there is an image cache whose registration period is "continuous" (yes at S1506), the relevant image cache is deleted from the cache table at S1507. Then, at S1508, a value of "same image present" is returned. In a case where the value of the registration period item is determined as not "next only" at S1504 (no at S1504), or in a case where the value of the registration period item is determined as not "continuous" at S1506 (no at S1506), the procedure proceeds to S1508 without the cache being deleted.

On the other hand, in a case where the arithmetic value is determined to be different at S1503 (no at S1503), a determination is performed at S1510 as to whether or not the value of the registration period 503 of the referenced cache table is "continuous" or "next only." In a case where it is determined to be "continuous" or "next only" (yes at S1510), the relevant image cache is deleted from the cache table at S1511. Then the procedure returns to S1501, and S1502 and S1503 are executed in regard to later cache tables also. In a case where it is determined at S1510 that it is not "continuous" or "next only," the procedure returns to S1501. Then, interest is given successively to the image caches registered in the cache. In a case where all the image caches are checked at S1501 and it is determined that there is no uncompared image cache (no at S1501), a value of "no same image" is returned at S1520. Then, the present process finishes. It should be noted that, as stated earlier, the registration periods shown here are one example, and in a case where registration periods other than those described above are defined, the timing for registration period expiration defined for each object is determined at S1504, S1506, and S1510. Thus, a process is carried out by which an object of interest, if it is expired, is deleted from the cache.

Flowchart of Image Cache Registration Processing

Figure 8:
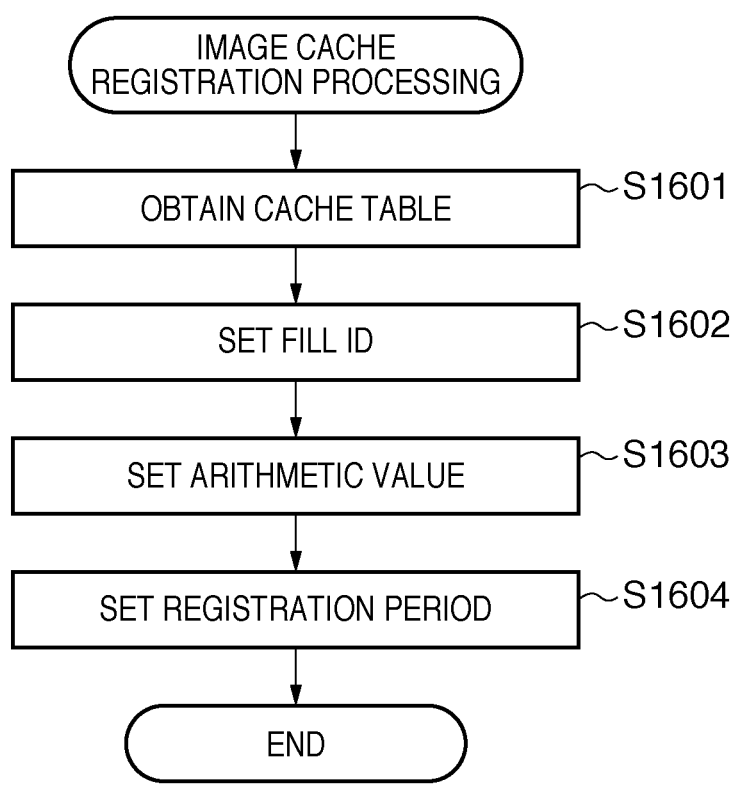
FIG. 8 is a diagram showing a flowchart of cache registration processing according to the present embodiment.

FIG. 8 is a diagram showing a flowchart of image cache registration processing at S1440. At S1601, an empty cache table is obtained. At S1602, an ID obtained at S1414, S1424, or S1435 is set in the fill ID 501 of the cache table. At S1603, an arithmetic value obtained at S1411, S1421, or S1431 is set in the arithmetic value 502 of the cache table. At S1604, a registration period set at S1415, S1425, or S1435 is set in the registration period 503 of the cache table. Then, the present process finishes.

Processing Example (Text)

Figure 9:
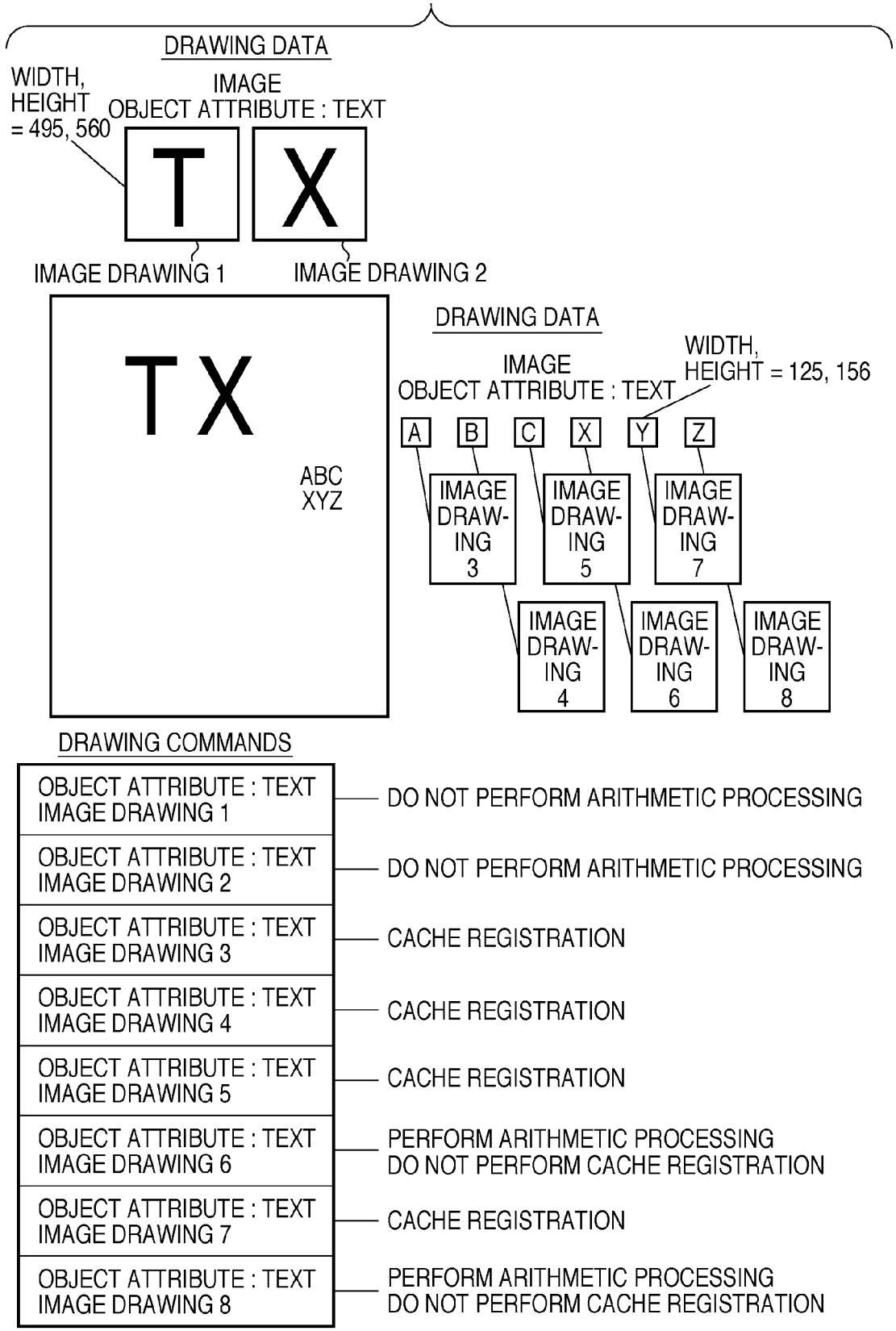
FIG. 9 is a diagram for describing a case where an object attribute is text according to the present embodiment.

FIG. 9 is one example of a case where an object attribute is text when the present embodiment is applied. An image drawing 1 and image drawing 2 have a size of 495×560, and therefore according to the determination at S1410, image cache processing finishes without any processing. On the other hand, image drawings 3 to 5 and image drawing 7 have a size of 125×156, and therefore are less than the threshold (256×256). Accordingly, through the arithmetic processing of S1411 and the image cache search of S1412, image cache registration is carried out with a registration period of "page" at S1440. Furthermore, the image drawing 6 and image drawing 8 will have the same arithmetic value as the image drawing 3 and image drawing 5 obtained already through arithmetic processing at S1411, and therefore image cache registration is not carried out.

Processing Example (Image)

Figure 10:
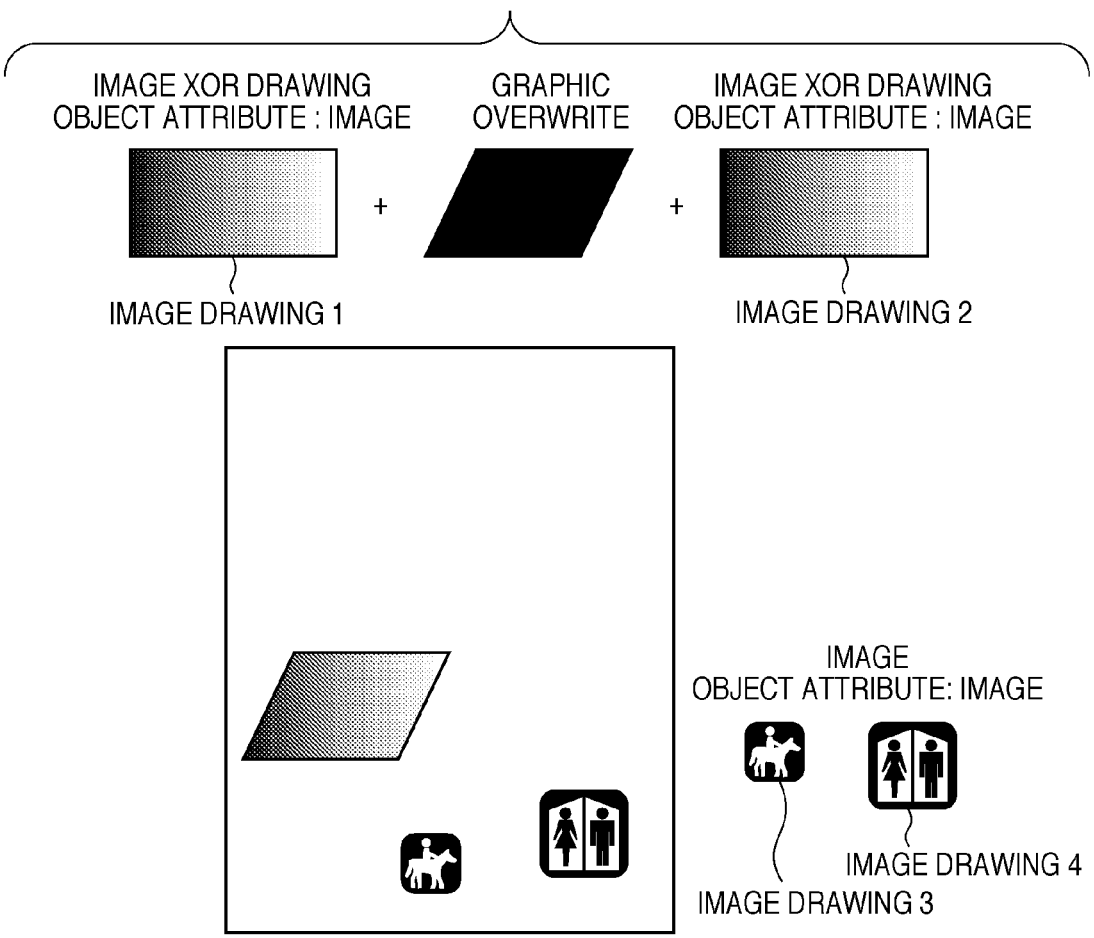
FIG. 10 is a diagram for describing a case where an object attribute is image according to the present embodiment.

FIG. 10 is one example of a case where an object attribute is image when the present embodiment is applied. The raster operation of the image drawing 1 is determined to be XOR at S1420, and through the arithmetic processing of S1421 and the image cache search of S1422, it is registered in the image cache with a registration period of "next only" at S1440. Next, the raster operation of the image drawing 2 is determined to be XOR at S1420, and it is evident from the image cache search of S1422 to be the same as the image drawing 1 and image cache registration is not carried out. On the other hand, the raster operation of the image drawings 3 and 4 is overwrite, and therefore nothing is done and the procedure finishes.

Processing Example (Graphic)

Figure 11:
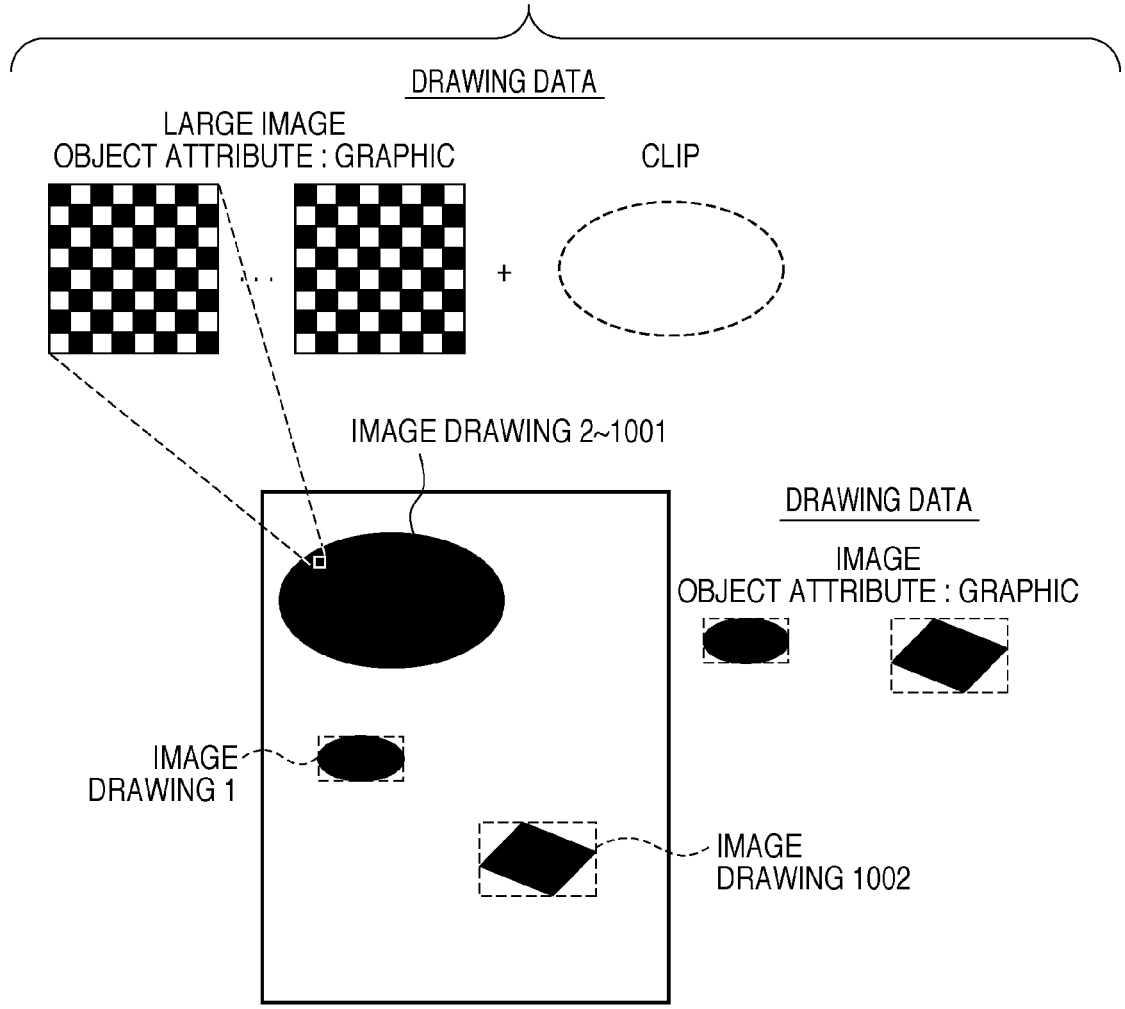
FIG. 11 is a diagram for describing a case where an object attribute is graphic according to the present embodiment.

FIG. 11 is one example of a case where an object attribute is graphic when the present embodiment is applied. The image drawing 1 and an image drawing 1002 are not determined to be patterns at S1431, such that the procedure finishes for these without processing. On the other hand, the image drawing 2 is determined to be a pattern at S1431, and through the arithmetic processing of S1432 and the image cache search of S1433, it is registered in the image cache with a registration period of "continuous" at S1440. Next, image drawing 3 to image drawing 1001 are repetitions of a pattern having regularity. Based on this, a pattern is determined at S1431, and it is evident from the image cache search of S1433 that they are the same as the image drawing 2 such that image cache registration is not carried out.

According to the above, text that is small in size and for which same data is commonly drawn many times is determined by size only for cache processing execution, thereby enabling memory efficiency to be improved. Furthermore, images that are large in size and for which same data is not commonly drawn many times are determined by specified drawing methods only for cache processing execution, thereby keeping the execution of time-consuming image specifying processing to a necessary minimum and enabling performance reductions to be avoided. Furthermore, graphics for which same data is not commonly drawn many times are determined by specified patterns only for cache processing execution, thereby enabling performance reductions to be avoided. Thus, with the present embodiment, execution of time-consuming image specifying processing is kept to a necessary minimum and performance reductions can be avoided. Furthermore, cache registration is avoided for images having low reusability, which achieves improvements in cache usage efficiency and improvements in cache search efficiency, thereby enabling performance to be improved.

With the present invention, execution of time-consuming image specifying processing is kept to a necessary minimum and performance reductions can be avoided. Furthermore, with the present invention, cache registration is avoided for objects having low reusability, which achieves improvements in cache usage efficiency and improvements in cache search efficiency, thereby enabling performance to be improved.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-069011 filed on Mar. 19, 2009, which is hereby incorporated by reference herein in its entirety.

What is claimed is:

1. An image forming apparatus, comprising:
   an analysis unit configured to analyze print data and give interest successively to objects contained in the print data;
   an attribute determination unit configured to determine, from at least text, graphic, and image, an object attribute possessed by an object of interest;
   a cache search unit configured to search for the object of interest in a cache;
   a cache registration unit configured to register the object of interest in the cache; and an execution decision unit configured to,
- in a case where the object attribute of the object of interest is text, decide based on a first criterion whether or not to apply the cache search unit and the cache registration unit on the object of interest,
- in a case where the object attribute of the object of interest is image, to decide based on a second criterion whether or not apply the cache search unit and the cache registration unit on the object of interest, and
- in a case where the object attribute of the object of interest is graphic, to decide based on a third criterion whether or not to apply the cache search unit and the cache registration unit on the object of interest,
- wherein the first, second, and third criterion are different each other.

2. The image forming apparatus according to claim 1, wherein the execution decision unit performs decision based on a size of the object in a case where the object attribute is text, based on a raster operation by which the object of interest is to be drawn in a case where the object attribute is image, and based on a repetition of a pattern having regularity in a case where the object attribute is graphic.

3. The image forming apparatus according to claim 1, wherein the cache registration unit registers the object of interest, information obtained by the analysis unit, and a registration period indicating a period for which the object of interest is to be held in the cache.

4. The image forming apparatus according to claim 3, wherein the cache search unit performs searching based on the information obtained by the analysis unit and the registration period.

5. The image forming apparatus according to claim 1, further comprising:
- a decision unit configured to decide whether or not to execute cache processing on a relevant object under a different condition in accordance with the object attribute determined by the attribute determination unit.

6. The image forming apparatus according to claim 1, further comprising:
- a raster operation determination unit configured to determine a raster operation of a relevant object when the object attribute of the relevant object is determined by the attribute determination unit to be image,
- wherein cache processing of the relevant object is not executed in a case where the raster operation of the relevant object is determined by the raster operation determination unit not to be a specified raster operation, and cache processing of the relevant object is executed in a case where the raster operation is determined to be a specified raster operation.

7. A control method for an image forming apparatus, comprising:
- analyzing print data and giving interest successively to objects contained in the print data;
- determining, from at least text, graphic, and image, an object attribute possessed by an object of interest;
- searching for the object of interest in a cache;
- registering the object of interest in the cache; and
- an execution decision step of,
  - deciding, in a case where the object attribute of the object of interest is text, based on a first criterion, whether or not to apply the cache searching and the cache registering for the object of interest,
  - deciding, in a case where the object attribute of the object of interest is image, based on a second criterion, whether or not to apply the cache searching and the cache registering on the object of interest, and
  - deciding, in a case where the object attribute of the object of interest is graphic, based on a third criterion, whether or not to apply the cache searching and the cache registering on the object of interest,
  - wherein the first, second, and third criterion are different each other.

8. A non-transitory computer-readable storage medium storing a computer program that, when executed by a processor, causes a computer to function as:
- an analysis unit configured to analyze print data and give interest successively to objects contained in the print data;
- an attribute determination unit configured to determine, from at least text, graphic, and image, an object attribute possessed by an object of interest;
- a cache search unit configured to search for the object of interest in a cache;
- a cache registration unit configured to register the object of interest in the cache; and
- an execution decision unit configured to,
  - in a case where the object attribute of the object of interest is text, to decide based on a first criterion whether or not to apply the cache search unit and the cache registration unit on the object of interest,
  - in a case where the object attribute of the object of interest is image, to decide based on a second criterion whether or not to apply the cache search unit and the cache registration unit on the object of interest, and
  - in a case where the object attribute of the object of interest is graphic, to decide based on a third criterion whether or not to apply the cache search unit and the cache registration unit on the object of interest,
  - wherein the first, second, and third criterion are different each other.

9. An image forming apparatus, comprising:
- an analysis unit configured to analyze print data and give interest successively to objects contained in the print data;
- an attribute determination unit configured to determine, from among a plurality of object attributes, an object attribute possessed by an object of interest;
- a cache search unit configured to search for the object of interest in a cache,
- a cache registration unit configured to register the object of interest in the cache; and
- an execution decision unit configured to decide, based on a raster operation, whether or not to apply the cache search unit and the cache registration unit on the object of interest in a case where the object attribute of the object of interest is determined by the attribute determination unit as image.

10. The image forming apparatus according to claim 9, wherein the execution decision unit decides to apply the cache search unit and the cache registration unit on the object of interest of image attribute in a case where the raster operation is a predetermined raster operation.

11. The image forming apparatus according to claim 10, wherein the predetermined raster operation is XOR.

12. The image forming apparatus according to claim 9, wherein the execution decision unit further decides based on a repetition of a pattern having regularity whether or not to apply the cache search unit and the cache registration unit on the object of interest in a case where the object attribute of the object of interest is determined by the attribute determination unit as graphic.

13. A control method for an image forming apparatus, comprising:

analyzing print data and giving interest successively to objects contained in the print data;

determining, from among a plurality of object attributes, an object attribute possessed by an object of interest;

searching for the object of interest in a cache;

registering the object of interest in the cache; and deciding, based on a raster operation, whether or not to apply the cache searching and the cache registering on the object of interest in a case where the object attribute of the object of interest is determined by the determining as image.

14. A non-transitory computer-readable storage medium storing a computer program that, when executed by a processor, causes a computer to function as:

an analysis unit configured to analyze print data and give interest successively to objects contained in the print data;

an attribute determination unit configured to determine, from among a plurality of object attributes, an object attribute possessed by an object of interest;

a cache search unit configured to search for the object of interest in a cache;

a cache registration unit configured to register the object of interest in the cache; and an execution decision unit configured to decide, based on a raster operation, whether or not to apply the cache search unit and the cache registration unit on the object of interest in a case where the object attribute of the object of interest is determined by the attribute determination unit as image.

15. An image forming apparatus, comprising:

an analysis unit configured to analyze print data and give interest successively to objects contained in the print data;

an attribute determination unit configured to determine, from among a plurality of object attributes, an object attribute possessed by an object of interest;

a cache search unit configured to search for the object of interest in a cache;

a cache registration unit configured to register the object of interest in the cache; and an execution decision unit configured to decide, based on a repetition of a pattern having regularity, whether or not to apply the cache search unit and the cache registration unit on the object of interest in a case where the object attribute of the object of interest is determined by the attribute determination unit as graphic.

16. A control method for an image forming apparatus, comprising:

analyzing print data and giving interest successively to objects contained in the print data;

determining, from among a plurality of object attributes, an object attribute possessed by an object of interest;

searching for the object of interest in a cache;

registering the object of interest in the cache; and deciding, based on a repetition of a pattern having regularity, whether or not to apply the cache searching and the cache registering on the object of interest in a case where the object attribute of the object of interest is determined by the determining as graphic.

17. A non-transitory computer-readable storage medium storing a computer program that, when executed by a processor, causes a computer to function as:

an analysis unit configured to analyze print data and give interest successively to objects contained in the print data;

an attribute determination unit configured to determine, from among a plurality of object attributes, an object attribute possessed by an object of interest;

a cache search unit configured to search for the object of interest in a cache;

a cache registration unit configured to register the object of interest in the cache; and an execution decision unit configured to decide, based on a repetition of a pattern having regularity, whether or not to apply the cache search unit and the cache registration unit on the object of interest in a case where the object attribute of the object of interest is determined by the attribute determination unit as graphic.

* * * * *